(No Model.)
H. D. FANDERS.
TOBACCO PIPE.
No. 587,947. Patented Aug. 10, 1897.
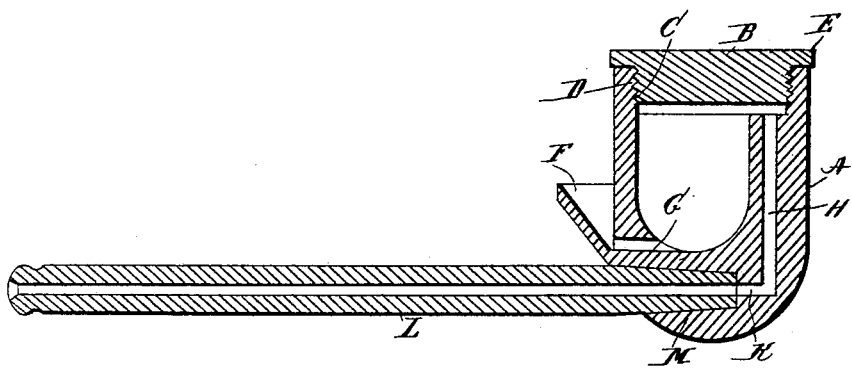
WITNESSES:
INVENTOR
Henry D. Fanders.
BY
Edgar Tate & Co
ATTORNEYS.

UNITED STATES PATENT OFFICE.

HENRY DICKS FANDERS, OF LEADVILLE, COLORADO.

TOBACCO-PIPE.

SPECIFICATION forming part of Letters Patent No. 587,947, dated August 10, 1897.

Application filed April 30, 1897. Serial No. 634,537. (No model.)

*To all whom it may concern:*

Be it known that I, HENRY DICKS FANDERS, a citizen of the United States, residing at Leadville, in the county of Lake and State of Colorado, have invented certain new and useful Improvements in Tobacco-Pipes, of which the following is a full and complete specification, such as will enable those skilled in the art to which it appertains to make and use the same.

This invention relates to tobacco-pipes, and the object thereof is to provide an improved device of this class which is so constructed that the air enters the bottom of the bowl and passes out through the top in the operation of smoking, the smoke being carried downwardly through a passage formed in the side of the bowl and into and through the stem, which communicates with said passage.

The invention is fully disclosed in the following specification, of which the accompanying drawing forms a part, in which the separate parts of my improvement are designated by letters of reference, said drawing being a central vertical section of the bowl of a tobacco-pipe and a longitudinal section of the stem.

In the practice of my invention I provide a pipe which comprises a bowl A, which is provided with a removable cap or cover B, and said cap or cover is preferably screw-threaded, as shown at C, and the upper part of the bowl is provided with a corresponding screw-thread D, but said screw-threads are not necessary and may or may not be employed, and the cap or cover B is also provided with an annular flange or rim E, which rests on the top of the bowl. Formed on or connected with one side of the bowl, preferably the front side thereof, is a receptacle F, the bottom of which communicates with the bottom of the bowl by means of a passage G, and formed in the opposite side of the bowl is a vertical passage H, which is open at the top and which is provided at its lower end with an angular extension K, with which the central bore of the stem L communicates, and the bottom of the bowl of the pipe is provided with a socket M, which is adapted to receive the inner end of said stem. By means of this construction I prevent nicotine and other substances from passing from the bottom of the bowl of the pipe into and through the stem L, and said stem may also be easily detached from the bowl of the pipe and cleaned whenever necessary, but this operation will be rendered much less frequently necessary than in tobacco-pipes as usually constructed, and it will also be apparent that any nicotine or other substances that may collect in the passage G, through which the air passes into the bowl of the pipe, may be easily removed therefrom, this passage being very short.

Having fully described my invention, I claim as new and desire to secure by Letters Patent—

As an improved article of manufacture a tobacco-pipe, consisting of a bowl A, provided with a screw-threaded cover B, having an annular flange E; a receptacle F, which is in communication with the bottom of said bowl by the passage G, there being a vertical passage H, formed in the opposite side of the bowl and having an extension K, said bowl being provided with a socket M, a stem L, inserted therein beneath passage G the bore of which communicates with the said extension K, substantially as and for the purpose set forth.

In testimony that I claim the foregoing as my invention I have signed my name, in presence of the subscribing witnesses, this 24th day of April, 1897.

HENRY DICKS FANDERS.

Witnesses:
I. H. HILLMAN,
EILER DETERT.